United States Patent [19]
Kawabata

[11] Patent Number: 4,905,152
[45] Date of Patent: Feb. 27, 1990

[54] ACTIVELY CONTROLLED SUSPENSION SYSTEM WITH CONTROL CHARACTERISTICS VARIABLE DEPENDING UPON VEHICULAR SPEED

[75] Inventor: Kazunobu Kawabata, Kanagawa, Japan

[73] Assignee: Nissan Motor Company, Limited, Yokohama, Japan

[21] Appl. No.: 263,764

[22] Filed: Oct. 28, 1988

[30] Foreign Application Priority Data

Oct. 29, 1987 [JP] Japan .................................. 62-274425

[51] Int. Cl.$^4$ ............................................. B60G 17/00
[52] U.S. Cl. ................................. 364/424.05; 280/707
[58] Field of Search ...................... 364/424.05, 424.01; 280/707, 714, 688, 689

[56] References Cited

U.S. PATENT DOCUMENTS

| | | | |
|---|---|---|---|
| 4,652,010 | 3/1987 | Sugasawa | 280/707 |
| 4,717,172 | 1/1988 | Asami et al. | 280/707 |
| 4,730,843 | 3/1988 | Tanaka et al. | 280/689 |
| 4,744,589 | 5/1988 | Buma et al. | 280/707 |
| 4,789,935 | 11/1988 | Buma et al. | 364/424.05 |
| 4,830,394 | 5/1989 | Yasuike et al. | 364/424.05 |

Primary Examiner—Parshotam S. Lall
Assistant Examiner—Thomas G. Black
Attorney, Agent, or Firm—Foley & Lardner, Schwartz, Jeffery, Schwaab, Mack, Blumenthal & Evans

[57] ABSTRACT

An actively controlled suspension system which successfully prevents a vehicular height from abruptly changing even when failure of a vertical acceleration occurs. The actively controlled suspension system introduces a technology in performing suspension control, such as bouncing control, to shape a vehicular attitude indicative sensor signal, such as vertical acceleration indicative signal by slicing the sensor signal level at a predetermined slice level. In view of suppression of abrupt change of vehicular height at any vehicular driving condition, the slice level introduced in the present invention, is variable depending upon a vehicle speed.

28 Claims, 8 Drawing Sheets

ACTIVELY CONTROLLED SUSPENSION SYSTEM WITH CONTROL CHARACTERISTICS VARIABLE DEPENDING UPON VEHICULAR SPEED

BACKGROUND OF THE INVENTION

1. Field of the Invention

The present invention relates generally to an actively controlled suspension system which is variable of suspension characteristics depending upon a vehicle driving condition for suppressing vehicular attitude change. More specifically, the invention relates to an actively controlled suspension system which is variable of control characteristics, such as sensitivity of vehicular attitude change, depending upon the vehicle driving condition. Further particularly, the invention relates to a suspension control system performing suspension control including bouncing suppressive control.

2. Description of the Background Art

Actively controlled suspension systems gains popularity in automotive vehicles because of remarkable performance in achieving both of driving stability and riding comfort. Such suspension systems performs various control, such as anti-rolling and/or anti-pitching control, bounding suppressive control and so forth, for regulating vehicular body attitude at various vehicle driving mode condition.

In general, bouncing suppressive suspension control is performed for suppressing relative displacement between a vehicle body and a suspension member which rotatably supports a road wheel. Relative displacement between the vehicle body and a suspension member is monitored by means of a sensor, such as a vertical acceleration sensor, a stroke sensor and so forth. In case that the vertical acceleration sensor is used for monitoring the vertical and relative displacement between the vehicle body and the suspension member, the vertical acceleration value is integrated to obtain data representative of the relative displacement between the vehicle body and the suspension member. Since the suspension control for adjusting stiffness or suspension characteristics depending upon the magnitude of vertical displacement between the vehicle body and the suspension member derived on the basis of the vertical acceleration monitored by the vertical acceleration sensor, failure of the vertical acceleration sensor directly results in malfunctioning of the suspension control. For instance, when the vertical acceleration indicative sensor signal increases in stepwise fashion due to failure of the vertical acceleration sensor, the erroneously increased level of vertical acceleration sensor signal is amplified through the bouncing control system to cause abrupt change of the vehicular height. Such abrupt change in the vehicular height clearly degrades riding comfort and drive feeling. Therefore, in case of failure of the sensor means which causes error in the monitored vehicular driving condition data, fail-safe operation has to be performed for controlling suspension system to predetermined suspension mode for assure safety.

SUMMARY OF THE INVENTION

Therefore, it is an object of the present invention to provide an actively controlled suspension system which successfully prevent a vehicular height from abruptly changing even when failure of a vertical acceleration occurs.

In order to accomplish aforementioned and other objects, an actively controlled suspension system, according to the present invention, introduces a technology in performing suspension control, such as bouncing control, to shape a vehicular attitude indicative sensor signal, such as vertical acceleration indicative signal by slicing the sensor signal level at a predetermined slice level. In view of suppression of abrupt change of vehicular height at any vehicular driving condition, the slice level introduced in the present invention is variable depending upon a vehicle speed. According to one aspect of the invention, an actively controlled suspension system comprises:

a cylinder disposed between a vehicle body and a suspension member which rotatably support a road wheel, and defining therein a working chamber filled with a pressure medium variable of pressure between a predetermined maximum pressure and a predetermined minimum pressure;

a pressure medium source circuit means connected to the working chamber, for supplying the pressure medium to the working chamber of the cylinder;

a pressure control valve means disposed within the pressure medium circuit means and variable of valve position between a first mode for increasing pressure of the pressure medium within the working chamber, a second mode for decreasing pressure in the pressure medium within the working chamber, and a third mode for maintaining the pressure in the pressure medium constant;

a vehicular attitude change monitoring means for monitoring vehicle body attitude change for producing a vehicle body attitude change indicative sensor signal;

a vehicular speed monitoring means for monitoring a vehicular driving speed and producing a vehicle speed indicative signal representative of the monitored vehicular speed;

a limiting means for receiving the attitude change indicative sensor signal and limiting variation range of the value of the attitude change indicative sensor signal within a predetermined range; and a controller means receiving the sensor signal having the limited range of signal value for deriving a control signal for controlling the pressure control valve means in order to suppress attitude change, the controller means being responsive to the vehicular speed indicative signal for varying the variation range of the attitude change indicative sensor signal depending upon the vehicle speed indicative signal value. The controller means may set the attitude change indicative sensor signal value variation range with respect to an initial value of the attitude change indicative sensor signal which is produced when the vehicular attitude is a neutral position and defines the variation range with an upper and a lower slice level. The controller means derives a slice level indicative value representative of magnitude of difference of the upper and lower slice level from the initial value on the basis of the vehicle speed indicative sensor signal and adjusts the upper and lower slice level based thereon. The controller means varies the slice level indicative value to reduce the value according to increasing of the vehicle speed indicative sensor signal value.

The controller means may vary the slice level indicative value to be inversely proportional to the v vehicle speed indicative sensor signal value. Alternatively, the controller means may vary the slice level indicative value in stepwise fashion according to variation of the vehicle speed indicative sensor signal value.

In the practical control, the controller means modifies the vehicular attitude change indicative sensor signal level higher than the upper slice level to a value corresponding to the upper slice level and lower than the lower slice level to a value corresponding to the lower slice level. The controller means is set a pressure control characteristics for controlling pressure of the pressure medium within the working chamber to vary variation speed of the pressure depending upon the signal level of the vehicular attitude change indicative sensor signal.

According to another aspect of the invention, an actively controlled suspension system comprises:

a cylinder disposed between a vehicle body and a suspension member which rotatably support a road wheel, and defining therein a working chamber filled with a pressure medium variable of pressure between a predetermined maximum pressure and a predetermined minimum pressure;

a pressure medium source circuit means connected to the working chamber, for supplying the pressure medium to the working chamber of the cylinder;

a pressure control valve means disposed within the pressure medium circuit means and variable of valve position between a first mode for increasing pressure of the pressure medium within the working chamber, a second mode for decreasing pressure in the pressure medium within the working chamber, and a third mode for maintaining the pressure in the pressure medium constant;

a vehicular attitude change monitoring means for monitoring acceleration exerted on the vehicle body and causing attitude change of the vehicle body, for producing an acceleration indicative sensor signal;

a vehicular speed monitoring means for monitoring a vehicular driving speed and producing a vehicle speed indicative signal representative of the monitored vehicular speed;

a limiting means for receiving the acceleration indicative sensor signal and limiting variation range of the value of the acceleration indicative sensor signal within a predetermined range;

a controller means receiving the acceleration indicative sensor signal having the limited range of signal value for deriving a control signal for controlling the pressure control valve means in order to suppress attitude change on the basis of the acceleration indicative sensor signal, the controller means being responsive to the vehicular speed indicative signal for varying the variation range of acceleration indicative sensor signal depending upon the vehicle speed indicative signal value.

The controller means may derive an attitude change stroke data on the basis of the acceleration indicative sensor signal to derive the control signal on the basis of the attitude change stroke data.

According to a further aspect of the invention, a bouncing control system for an automotive suspension system, comprises:

a cylinder disposed between a vehicle body and a suspension member which rotatably support a road wheel, and defining therein a working chamber filled with a pressure medium variable of pressure between a pressure and a predetermined minimum;

a pressure medium source circuit means connected to the working chamber, for supplying the pressure medium to the working chamber of the cylinder;

a pressure control valve means disposed within the pressure medium circuit means and variable of valve position between a first mode for increasing pressure of the pressure medium within the working chamber, a second mode for decreasing pressure in the pressure medium within the working chamber, and a third mode for maintaining the pressure in the pressure medium constant;

a vertical acceleration sensor means for monitoring a vertical acceleration exerted on the vehicle body and causing attitude change of the vehicle body, for producing a vertical acceleration indicative sensor signal;

a vehicular speed monitoring means for monitoring a vehicular driving speed and producing a vehicle speed indicative signal representative of the monitored vehicular speed;

a slicer means for receiving the vertical acceleration indicative sensor signal and slicing the acceleration indicative signal level out of a predetermined vertical acceleration indicative signal value variation range to produce a sliced level vertical acceleration indicative signal;

a controller means receiving the sliced level vertical acceleration indicative sensor signal for deriving a control signal for controlling the pressure control valve means in order to adjust the pressure of pressure medium within the working chamber to suppress bouncing of the vehicle body, on the basis of the sliced level vertical acceleration indicative sensor signal, the controller means being responsive to the vehicular speed indicative signal for varying the variation range of the vertical acceleration indicative sensor signal depending upon the vehicle speed indicative signal value.

Practically, the controller means may include a low-pass filer means for deriving the stroke data on the basis of the vertical acceleration indicative sensor signal value. In the alternative, the controller means may include an integrator means for deriving the stroke data on the basis of the vertical acceleration indicative sensor signal value.

DESCRIPTION OF THE PREFERRED EMBODIMENT

Figure 1:
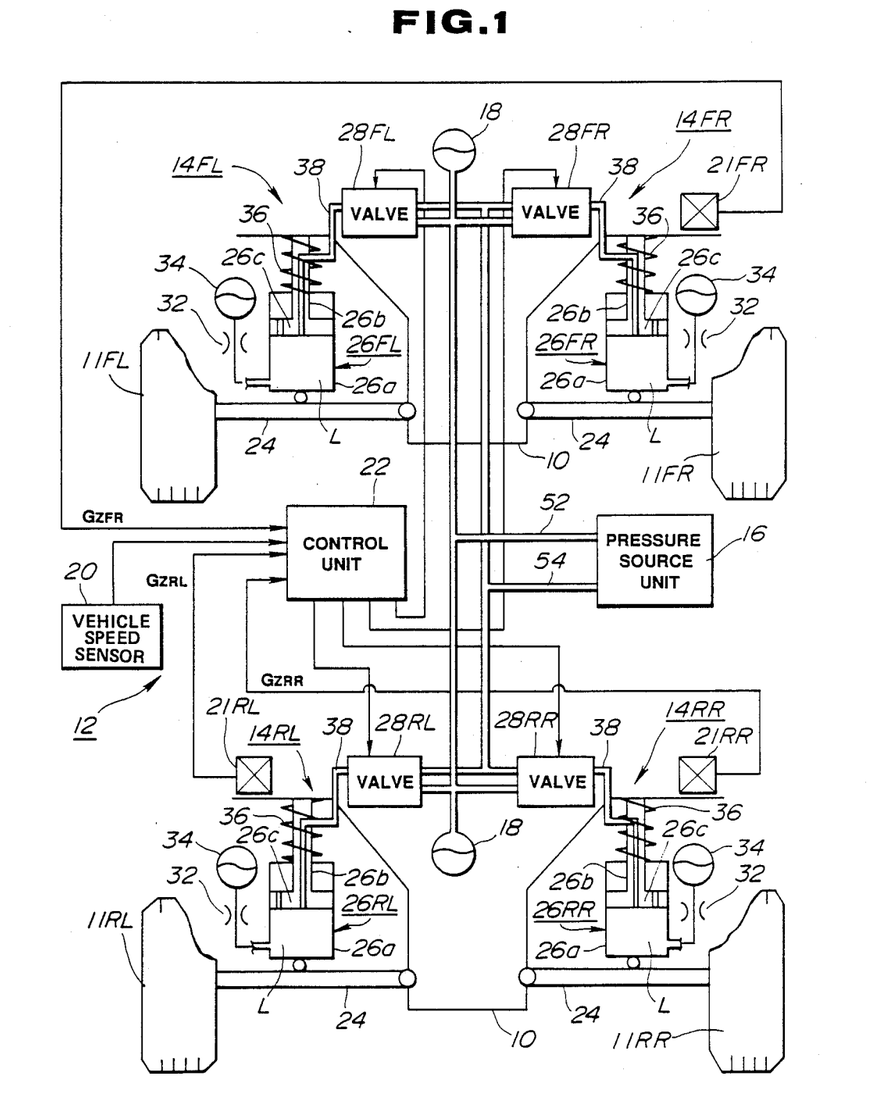
FIG. 1 is an illustration of the overall construction of the preferred embodiment of an actively controlled suspension system according to the present invention, in which preferred process of fail-detection and fail-safe operation is to be implemented.

Referring now to the drawings, particularly to FIG. 1, the preferred embodiment of an actively controlled suspension system, according to the present invention, is designed to generally perform suspension control for suppressing relative displacement between a vehicle body 10 and suspension members 24FL, 24FR, 24RL and 24RR provided in front-left, front-right, rear-left and rear-right suspension mechanisms 14FL, 14FR, 14RL and 14RR and rotatably supporting front-left, front-right, rear-left and rear-right wheels 11FL, 11FR, 11RL and 11RR, which suspension member will be represented by the reference numeral "24" as generally referred to, and suspension mechanisms will be represented by the reference numeral "14" as generally referred to suppressing vehicle body attitude change. Respective front-left, front-right, rear-left and rear-right suspension mechanisms 14FL, 14FR, 14RL and 14RR include hydraulic cylinders 26FL, 26FR, 26RL and 26RR, which hydraulic cylinder will be hereafter represented by the reference numeral "26" as generally referred to.

Each of the hydraulic cylinder 26 is disposed between the vehicle body 10 and the suspension member 24 to produce a damping force for suppressing relative displacement between the vehicle body and the suspension member. The hydraulic cylinder 26 has a cylinder body 26a. The cylinder body 26a defines a working fluid chamber therein. A piston 26c is disposed within the working fluid chamber to divide the working fluid chamber into a lower working chamber 26d and an upper reference pressure chamber 26e. As will be seen from FIG. 1, the working chamber 26d and the reference pressure chamber 26e are communicated each other via an orifice 26f defined through the piston 26c. The piston 26c is connected to the vehicle body 10 via a piston rod 26b. A suspension coil spring 36 is wound around the piston road 26b.

The working chamber 26d of each hydraulic cylinder 26 is connected to a hydraulic pressure source unit 16 via a pressure supply line 52, a pressure drain line 54, a pressure control valve unit 28FL, 28FR, 28RL and 28RR which will be hereafter represented by the reference numeral "28" as generally referred to, and a pressure line 38. As seen from FIGS. 1 through 3, the pressure line 38 is connected to a fluid path 26g defined through the piston rod 26b and the piston 26c. The working chamber 26d of the hydraulic cylinder 26 is further communicated with a pressure accumulator 34 via an orifice 32. Another pressure accumulators 18 are provided in the pressure supply line 52 for accumulating the excessive pressure generated by the pressure source unit 16.

The pressure control valve unit 28 comprises a proportioning valve and is designed to be controlled by an electric control signal for varying valve position according to variation of current value of the control signal. Generally, the pressure control valve unit 28 controls magnitude of introduction and draining of the pressurized working fluid into and from the working chamber 26d for adjusting the pressure in the working chamber for setting the damping mode of the hydraulic cylinder 26. To control the valve position of the pressure control valve unit 28, a control unit 22 which comprises a microprocessor, is provided.

The control unit 22 is connected to vertical acceleration sensors 21FR, 21RL and 21RR which monitors vertical accelerations exerted to the vehicle body at the portion of the front-right, rear-left and rear-right suspensions 14FR, 14RL and 14RR to produce vertical acceleration indicative signals GZFR, GZRL and GZRR. The vertical acceleration sensor will be hereafter represented by the reference numeral "21" as generally referred to. Similarly, the vertical acceleration indicative signal as generally referred to will be hereafter labeled as "Gz". In the shown embodiment, the vertical acceleration to be exerted on the vehicle body 10 at the portion of the front-left suspension 14FL is arithmetically derived on the basis of the vertical acceleration indicative signals GZFR, GZRL and GZRR. The control unit 22 is also connected to a vehicle speed sensor 20.

Though the shown embodiment employs three vertical acceleration sensors 21FR, 21RL and 21RR for monitoring vertical accelerations exerted to the vehicle body at the portion of the front-right, rear-left and rear-right suspensions 14FR, 14RL and 14RR, it is, of course possible to provide additional vertical acceleration sensor for monitoring the vertical acceleration to be exerted on the vehicle body at the portion of the front-left suspension 14FL.

Figure 2:
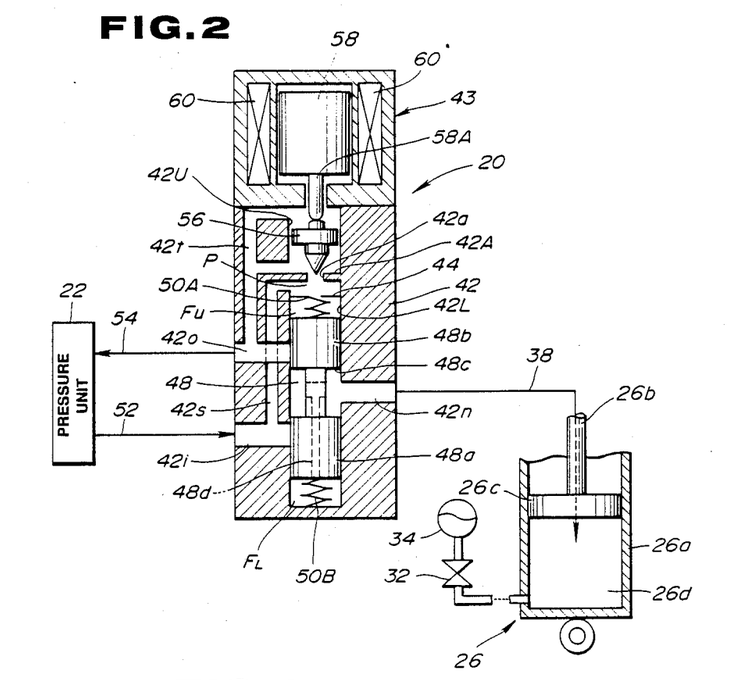
FIG. 2 is a sectional view of a pressure control valve employed in the preferred embodiment of the actively controlled suspension system of FIG. 1.

FIG. 2 shows the detailed construction of the pressure control valve unit 28 to be employed in the shown embodiment of the actively controlled suspension system set forth above.

The pressure control valve 28 comprises a valve housing 42 which housing a proportioning solenoid 43. The proportioning solenoid 43 is electrically connected to the control unit 22. The valve housing 42 defines a valve bore which is separated into a valve chamber 42L and a control chamber 42U by means of a partitioning member 42A. The partitioning member 42A is formed with communication hole 42a. Above the communication hole 42a is defined the control chamber 42U. The valve chamber 42L and the control chamber 42U are aligned to each other across the communication hole 42a. Beneath the communication hole 42a and adjacent the top of the valve chamber 42L, a stationary throttling orifice defining member 44 is provided. The throttling orifice defining member 44 is formed with a fixed throttling rate of orifice. The throttling orifice defining member 44 defines with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower end thereof and the bottom of the valve chamber 42L. Offset springs 50A and 50B are disposed within the upper and lower feedback chambers FU and FL, which offset springs exert spring force to the valve spool 48 for resiliently restricting movement of the latter. The valve chamber 42L is communicated with an inlet port 42*i*, a drain port 42*o* and the communication port 42*n* which are defined through the valve housing 42. The inlet port 42*i* is connected to the pressure unit 16 via a supply line 52. On the other hand, the drain port 42*o* is connected to the pressure unit 16 via the drain line 54.

The valve spool 48 is formed with an upper land 48*b* and a lower land 48*a*. The upper and lower lands 48*b* and 48*a* defines therebetween an annular pressure chamber 48*c*. The valve spool 48 is formed with a pilot path communicating the pressure chamber 48*c* with the lower feedback chamber FL.

A poppet valve member 56 is disposed within the control chamber 42U for thrusting or sliding movement therein. The poppet valve member 56 has a valve head opposing to the communication hole 42*a*. The poppet valve member 56 is operably associated with the proportioning solenoid 43 which comprises a plunger 58 which has a plunger rod 58A. The lower end of the plunger rod 58A of the plunger 58 opposes to the top end of the poppet valve 56. The poppet valve member 56 is driven by the plunger 58 to control the path area in the communication hole 42*a* according to the position of the plunger rod 58A. Therefore, the poppet valve member 56 adjusts the path area of the communication hole 42*a* to control fluid pressure to be introduced in the pilot chamber P. Poppet valve member 56 separates the control chamber 42U into upper and lower control chambers. In order to control the position of the poppet valve 56 for adjusting the pilot pressure in the pilot chamber P, a solenoid coil 60 is provided for energizing the deenergizing to cause axial shift of the plunger rod 58A.

By adjusting the fluid pressure in the pilot chamber P, the pressure in the upper feedback chamber FU is adjusted to exert an axially driving force to the valve spool 48 to cause axial shift. By this, selective fluid communication between the inlet port 42*i*, the drain port 42*o* and the communication port 42*n* can be established to adjust the fluid pressure at the communication port 42*n*. Since the pressure at the communication port 42*n* is equal to the fluid pressure in the working chamber 26*d* of the pressure cylinder 26, the damping force created by the pressure cylinder can be adjusted. The inlet port 42*i* is also connected to the pilot chamber P via a fluid path 42*s*. On the other hand, the drain port 42*o* is connected to control chamber 42U via a fluid path 42*t*.

In order to control the pressure at the communication port 42*n*, a control current I is applied to the solenoid coil 60.

Figure 3:
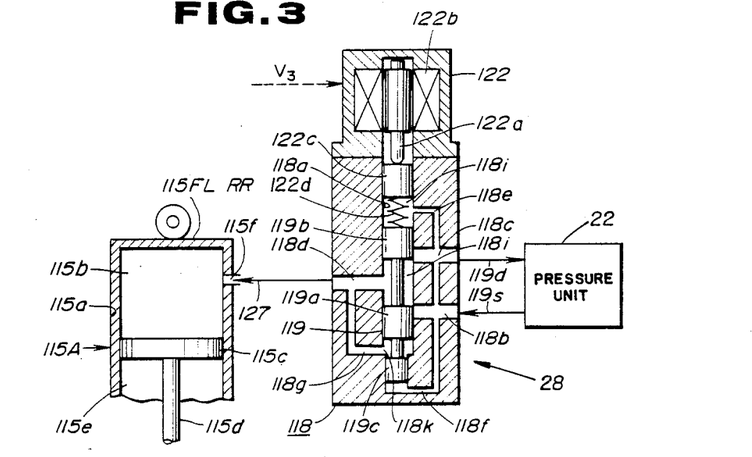
FIG. 3 is another embodiment of the pressure control valve to be employed in the preferred embodiment of the actively controlled suspension system of FIG. 1

FIG. 3 shows alternative embodiment of the pressure control valve unit 28 to be employed in the preferred embodiment of the actively controlled suspension system, according to the invention.

FIG. 3 shows the detailed construction of the hydraulic cylinder 115A and the pressure control valve 28. As will be seen from FIG. 3, the hollow cylinder housing 115*a* is formed with a port 115*f* communicating the upper fluid chamber 115*d* to an outlet port 118*d* of the pressure control valvel 28 via a communication line 127. Though FIG. 3 does not show clear construction, the lower fluid chamber 115*e* is defined as an enclosed space and is filled with the viscous working fluid. The pressure of the working fluid in the lower fluid chamber 115*e* at an initial position of the piston 115*c* serves as a reference pressure and per se serves as resistance for downward movement of the piston.

The pressure control valve 28 has a valve housing 118 having the aforementioned outlet port 118*d*, an inlet port 118*b* and a drain port 118*c*. Respective inlet port 118*b*, the drain port 118*c* and the outlet port 118*d* are connected to a valve bore 118*a* defined within the valve housing 118A. A valve spool 119 is disposed within the valve bore 118*a* for thrusting movement therein. The valve spool 119 has first, second and third lands 119*a*, 119*b* and 119*c*. As will be seen from FIG. 3, the third land 119*c* has smaller diameter than that of the first and second lands 119*a* and 119*b*. The third land 119*c* defines a fifth pressure control chamber 118*h* which is connected to the drain port 118*c* via a drain path 118*f*. An actuator piston 122*c* is also disposed within the valve bore 118*a*. The actuator piston 122*c* opposes the second land 119*b* in spaced apart relationship to define a second pressure control chamber 118*i* which is connected to the drain port 118*c* via a drain path 118*e*. An annular pressure chamber 118*j* is defined between the first and second lands 119*a* and 119*b*. The pressure chamber 118*j* is constantly communicated with the outlet port 118*d* and communicated with the upper fluid chamber 115*b*. On the other hand, the pressure chamber 118*j* shifts according to shifting of the valve spool 119 to selectively communicate with the inlet port 118*b* and the drain port 118*c*. On the other hand, a pressure control chamber 118*k* is defined between the first and third lands 119*a* and 119*c*. The pressure control chamber 118*k* is in communication with the outlet port 118*d* via a pilot path 118*g*. A bias spring 122*d* is interposed between the actuator piston 122*c* and the valve spool 119. The actuator piston 122*c* contacts with an actuator rod 122*a* of an electrically operable actuator 122 which comprises an electromagnetic solenoid. The solenoid 122 comprises a proportioning solenoid.

In order to increase the supply pressure of the working fluid, the spool valve 119 is shifted to the position to increase path area at a throttle constituted at the inner end of the inlet port 118*b* by means of the land 119*a* of the spool valve 119. On the other hand, in order to decrease the supply pressure of the working fluid, the spool valve is shifted to the position to decrease the path area at the throttle of the inner end of the inlet port 118*b* and opens the drain port 118 which is normally blocked by means of the land 119*b* of the spool valve.

As seen from FIG. 3, the proportioning solenoid 122 comprises the actuator rod 122*a* and a solenoid coil 122*b*. The solenoid coil 122*b* is energized by suspension control signal from the control unit. In the shown embodiment of the pressure control valve, the working fluid pressure P at the outlet port 118*d* is variable according to the predetermined variation characteristics. Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118*d* increases with a predetermined proportioning rate.

Namely, by increasing of the suspension control value, the actuator rod 122a is driven downwardly in FIG. 3 at a magnitude toward to position to achieve increasing of the fluid pressure with the predetermined proportioning rate. The fluid pressure at the outlet port 118d saturates at the output pressure of the pressure unit. On the other hand, when the suspension control signal value decreases, the pressure decreases to zero by shifting of the actuator rod 122a.

The actuator rod 122a of the proportioning solenoid 122 is associated with the actuator piston 122c. Contact between the actuation rod 122a and the actuator piston 122c can be maintained by the resilient force of the bias spring 122d which normally biases the actuator piston toward the actuation rod. On the other hand, the spring force of the bias spring 122d is also exerted on the valve spool 119 to constantly bias the valve spool downwardly in FIG. 3. The valve spool 119 also receives upward hydraulic force from the pressure control chamber 118k. Therefore, the valve spool 119 is oriented at the position in the valve bore at the position where the downward bias of the bias spring 122d balances with the upward hydraulic force of the pressure control chamber 118k.

Figure 4:
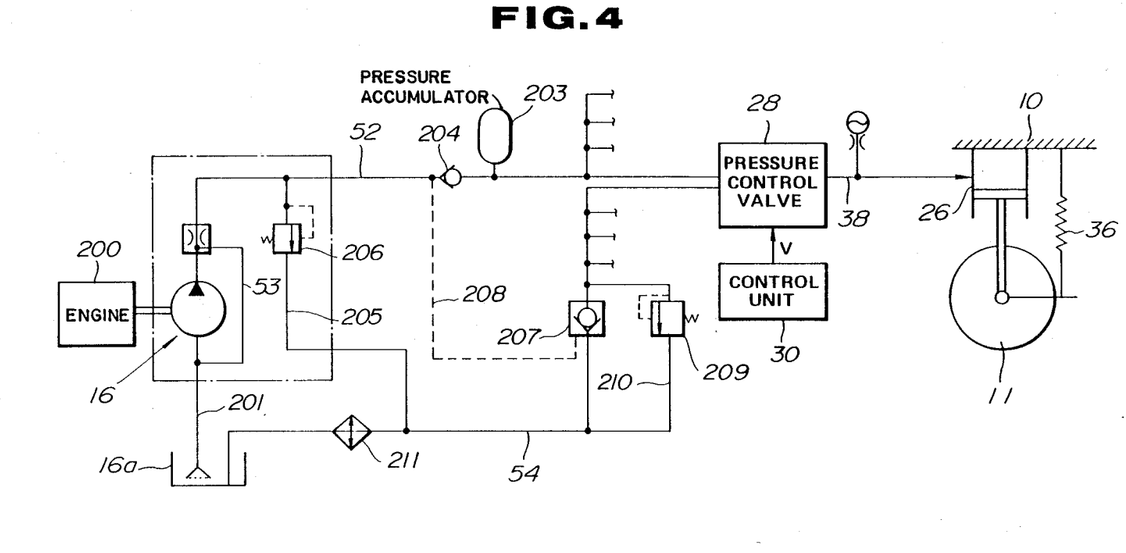
FIG. 4 is a circuit diagram of a hydraulic circuit to be employed in the preferred embodiment of the actively controlled suspension system according to the present invention.

FIG. 4 is a circuit diagram of a hydraulic circuit including the pressure source unit 16 and the working fluid chamber 26d of the hydraulic cylinder 26.

FIG. 4 shows detailed circuit construction of the preferred embodiment of the hydraulic system to be employed in the suspension control system according to the invention. As set forth, the pressure source unit includes the pressure unit 16 which comprises a fluid pump, and is connected to the reservoir 16a via a suction pipe 201 which is driven by means of an automotive engine 200. The outlet of the pressure unit 16, through which the pressurized working fluid is fed, is connected to the inlet port 42i of the pressure control valve 18 via the supply line 52. A pressure regulating orifice 202 is disposed in the supply line 52 to suppress pulse flow of the working fluid and to regulate the output pressure of the pressure unit 16 to be delivered to the pressure control valve 28. A feedback line 53 is connected to the upstream of the pressure regulating orifice 202 at one end. The other end of the feedback line 53 is connected to the upstream of the inlet of the pressure unit 16. Therefore, excessive fluid between the pressure unit 16 and the orifice 202 is fed back to the inlet side of the pressure unit.

A pressure accumulator 203 is also connected to the supply line 52 to receive therefrom the pressurized fluid for accumulating the pressure. A one-way check valve 204 is disposed in the supply line 52 at the position upstream of the junction between the pressure accumulator 203 and the supply line 52.

A pressure relief line 205 is also connected to the supply line 52 at the position intermediate between the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to the fluid pressure in the supply line 52 higher than a give value to drain part of the working fluid to the drain line for maintaining the pressure in the supply line 52 below the given pressure value.

On the other hand, a shut-off valve 207 is disposed in the drain line 54. The shut-off valve 207 is also connected to the supply line 52 upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 16a. On the other hand, the shut-off valve 207 is responsive to the pilot pressure drops below the given pressure level to be switched into shut-off position. At the shut-off position, the shut-off valve blocks fluid communication between the drain port 42o and the reservoir tank 16a.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm$^2$, in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 16a.

Pressurized fluid supply operation by the pressure source unit as set forth above will be discussed herebelow.

While the automotive engine 200 is running, the fluid pump as the pressure unit 16 is driven. Therefore, the working fluid in the reservoir tank 16a is sucked via the suction pipe 201 and pressurized through the pressure unit 16. The pressurized working fluid is discharged from the outlet of the pressure unit 16 and fed to the pressure control valve 28 via the supply line 54 including the pressure regulating orifice 202 and the one-way check valve 204. With the pressure control valve 28 in a position of FIG. 2, the pressurized working fluid passes the pressure control valve and is introduced into the working chamber 26d of the hydraulic cylinder 26. On the other hand, when the pressure control valve 28 is shifted to block communication between the supply line 52 and the working chamber 26d, the line pressure in the supply line increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus returned to the reservoir tank 16a.

The fluid pressure in the supply line 52 is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 28 and the reservoir tank 16a is maintained. At this position, the working fluid is thus returned to the reservoir tank 16a via the drain line 54 via the shut-off valve 207 and the oil cooler 211.

The shut-off valve 207, even at the open position, serves as a resistance to the fluid flow. Therefore, the fluid pressure in the drain line 54 upstream of the shut-off valve 207 becomes excessively higher, i.e. higher than the off-set pressure $P_O$. Then, the pressure relief valve 209 opens to allow the excessive pressure of the working fluid to flow through the by-pass line 210.

When the engine 200 stops, the pressure unit 16 ceases operation. By stopping the pressure unit 16, the working fluid pressure in the supply line 52 drops. According to drop of the pressure in the supply line 52, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 54 upstream of the shut-off valve 207 becomes equal to the pressure in the working chamber 26d. Therefore, even when the working fluid leaks through a gap between the spool valve 48 and the inner periphery of the valve bore, it will not affect the fluid pressure in the working chamber 26d.

This is advantageous to maintain the suspension characteristics of the suspension systems irrespective of the engine driving condition.

Figure 5:
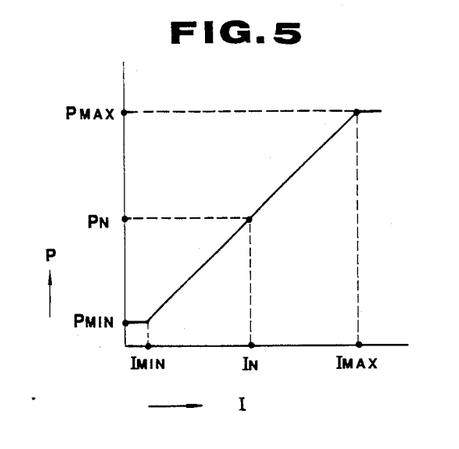
FIG. 5 is a chart showing relationship between an electric current value of a control signal to be output by a control unit and a hydraulic pressure in a pressure chamber of a hydraulic cylinder.

As seen from FIG. 5, the working fluid pressure in the working chamber 26d of the hydraulic cylinder 26 varies according to variation of the current value of the control signal applied to the pressure control valve unit 28. As seen from FIG. 5, hydraulic pressure in the working chamber 26d varies between a maximum pressure $P_{max}$ which is saturation pressure of the pressure source unit 16 and a minimum pressure $P_{min}$ which is set at a magnitude in view of a noise component to be contained in the control signal. As seen from FIG. 5, the maximum hydraulic pressure $P_{max}$ corresponds to the maximum current value $I_{max}$ of the control signal and the minimum hydraulic pressure $P_{min}$ corresponds to the minimum current value $I_{min}$ of the control signal. Furthermore, the hydraulic pressure level as labeled $P_n$ represents neutral pressure at the neutral current $I_n$. As seen, the neutral current value $I_n$ is set at an intermediate value between the maximum current value $I_{max}$ and the minimum current value $I_{min}$.

Figure 6:
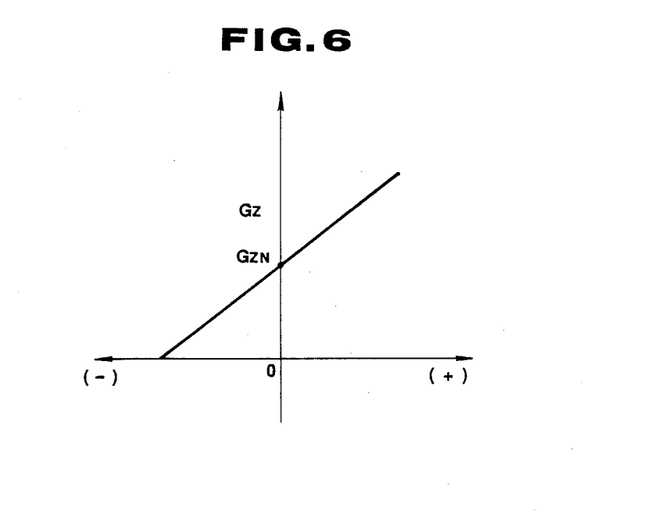
FIG. 6 is a chart showing variation of a vertical acceleration indicative sensor signal in relation to a magnitude of vertical acceleration exerted on a vehicular body.

On the other hand, the vertical acceleration indicative signals GZFR, GZRL and GZRR output by the vertical acceleration sensors 21FR, 21RL and 21RR varies linearly according to variation of the vertical accelerations respectively exerted on the vehicle body 10 at the front-right, rear-left and rear-right suspensions 14FR, 14RL and 14RR, as shown in FIG. 6. As will be seen from FIG. 6, the value of the vertical acceleration indicative sensor signal to be produced by the vertical acceleration sensor 21 varies across a predetermined neutral acceleration indicative value $GZ_n$ which represents the vertical acceleration exerted on the vehicle body is zero. In the shown embodiment, the vertical acceleration indicative signal GZ is maintained at a value greater than the neutral acceleration indicative value $GZ_n$ while the upward acceleration is exerted on the vehicle body to cause rebounding motion of the vehicle body and at a value smaller than the neutral acceleration indicative value $GZ_n$ while the downward acceleration is exerted on the vehicle body for causing bounding direction displacement of the vehicle body relative to the suspension member.

Figure 7:
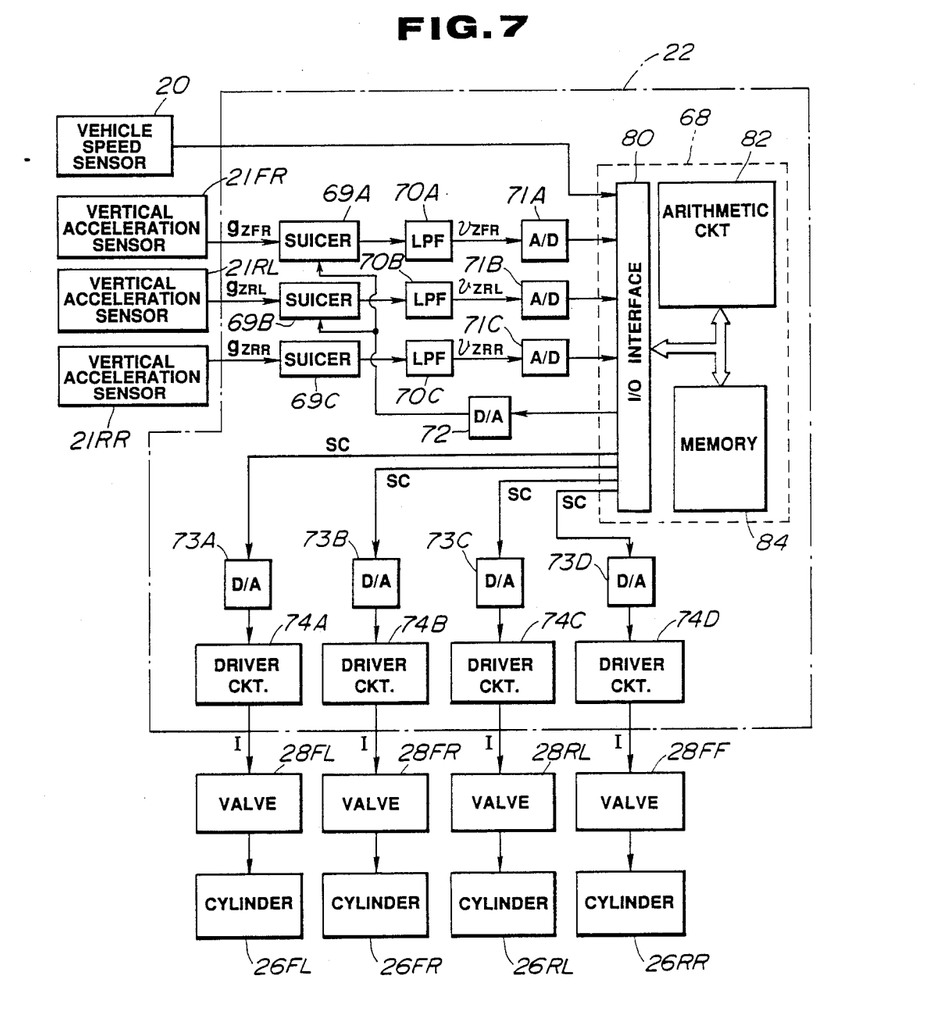
FIG. 7 is a schematic block diagram showing an electric circuit including a control unit, of the preferred embodiment of the actively controlled suspension system of FIG. 1.

As shown in FIG. 7, the control unit 22 comprises the microprocessor 68 including an input/output interface 80, an arithmetic circuit 82 and a memory 84. The vertical acceleration sensors 21FR, 21RL and 21RR are connected to low-pass filter circuits (LPF) 70a, 70b and 70c via slicer circuits 69a, 69b and 69c to feed the vertical acceleration indicative signals GZFR, GZRL and GZRR. Analog-to-digital (A/D) converters 71a, 71b and 71c are designed to convert analog form vertical acceleration indicative signal into a digital data representative of the vertical acceleration magnitude. The data output from the A/D converters 71a, 71b and 71c will be hereafter referred to as "vertical acceleration data".

Figure 8:
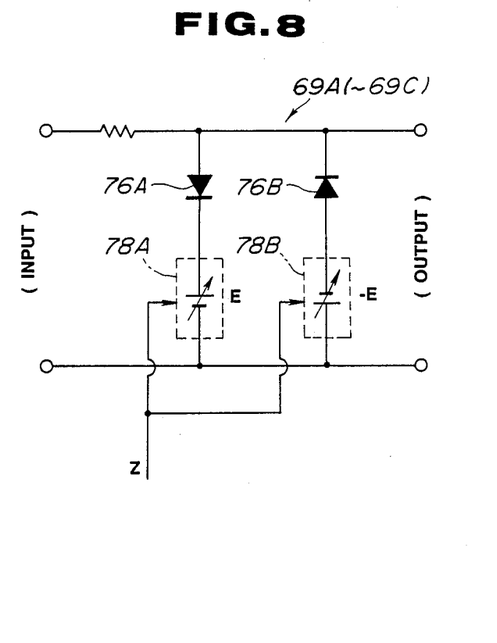
FIG. 8 is a circuit diagram of a slice level setting circuit employed in the preferred embodiment of the suspension control circuit of FIG. 7.
Figure 9:
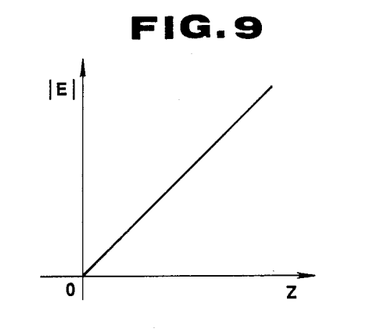
FIG. 9 is a graph showing relationship between a slice level setting signal value and slice level set by the slice level setting circuit of FIG. 8.

Each of the slicer circuits 69a, 69b and 69c slices the vertical acceleration indicative signal GZFR, GZRL and GZRR at a preset slice levels $+E$ and $-E$ to shape the vertical acceleration indicative signal from the associated one of the vertical acceleration sensors 21FR, 21RL and 21RR. Each of the slicer circuits 69a, 69b and 69c comprises a pair of diodes 76a and 76b arranged at mutually opposite polarity. The diodes 76a and 76b are connected in series to variable direct current sources 78a and 78b. The variable direct current sources 78a and 78b output voltages $+E$ and $-E$ which serve as positive and negative slice levels. The variable direct current sources 78a and 78b are adjustable of the output voltage level $|E|$ by a slice level setting signal Z input from the microprocessor 68. The output voltage level $|E|$ of each variable direct current source 78a and 78b varies in relation to the slice level setting signal Z as shown in FIG. 9. On the other hand, the microprocessor 68 varies the value of the slice level setting signal Z based on the vehicle speed data S of the vehicle speed sensor 20 according to the characteristics shown in FIG. 10.

The low-pass filter circuits 70a, 70b and 70c are designed for receiving the shaped vertical acceleration indicative signals GZFR, GZRL and GZRR from associated vertical acceleration sensors 21FR, 21RL and 21RR and integrating the received acceleration indicative signals to derive vertical stroke speed indicative signals vzFR, vzRL and vzRR. The vertical stroke speed indicative signals vzFR, vzRL and vzRR of the low-pass filters 70a, 70b and 70c are input to the input/output interface 80 of the microprocessor 68. The analog-to-digital converters 71a, 71b and 71c receive the stroke speed indicative signal from respective associated low-pass filters 70a, 70b and 70c in analog form and output a digital signal representative of the vertical stroke speed. This output data of the A/D converters 71a, 71b and 71c will be hereafter referred to as "stroke speed data".

The arithmetic circuit 78 processes the input vertical acceleration data and the stroke speed data to derive the values of the control signal SC to be fed to driver circuits 74a, 74b, 74c and 74d which are respectively connected to the actuators of the pressure control valve units 28FL, 28FR, 28RL and 28RR. The control signals SC are fed to the driver circuits 74a, 74b, 74c and 74d via digital-to-analog (D/A) converters 73a, 73b, 73c and 73d. The driver circuits 74a, 74b, 74c and 74d generate electric current I corresponding to the control signal values for controlling the valve position of the pressure control valve units 28 and adjust the hydraulic pressure in the pressure chambers 26d of the hydraulic cylinder 26 according to the characteristics shown in FIG. 5

Figure 11:
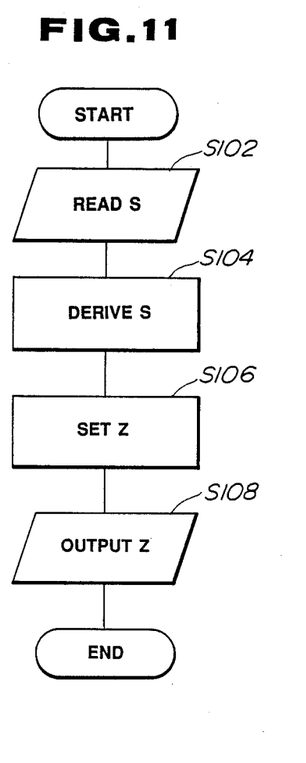
FIG. 11 is a flowchart of a routine for deriving the slice level setting signal.
Figure 12:
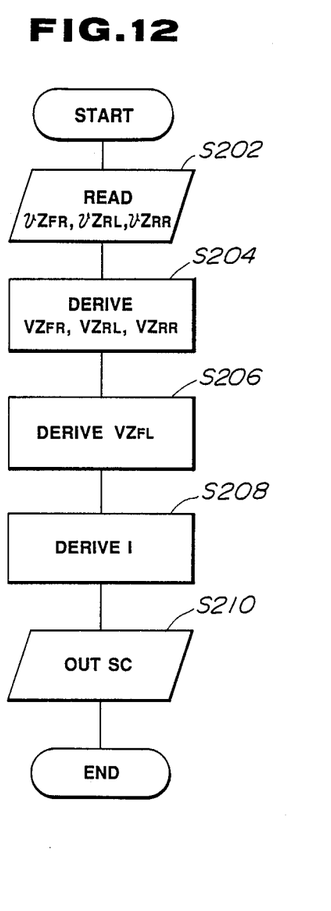
FIG. 12 is a flowchart of a suspension control program for deriving a suspension control signal.

The process of processing the vertical acceleration data and the stroke speed data to be performed in the microprocessor will be discussed herebelow with reference to FIGS. 11 and 12. The routines shown in FIGS. 11 and 12 are designed to be executed as interrupt routines to be executed interrupting a main program which governs various suspension control programs, such as anti-rolling control routine, anti-pitching control routine and so forth, and serves as a background job. In the practical embodiment, the routines shown in 11 and 12 are executed every 20 ms for example.

FIG. 11 shows a routine for deriving the slice level setting signal value Z on the basis of the vehicle speed indicative signal value S.

Immediately after starting execution, the vehicle speed indicative signal s input from the vehicle speed sensor 20 is read at step S102. Practically, the vehicle speed indicative signal s is a pulse signal having a frequency proportional to the vehicle speed. Based on the read vehicle speed indicative signal, a vehicle speed data S is derived at a step S104. In practice, the vehicle speed data S is derived by counting number of pulses of the vehicle speed indicative signal s.

Figure 10:
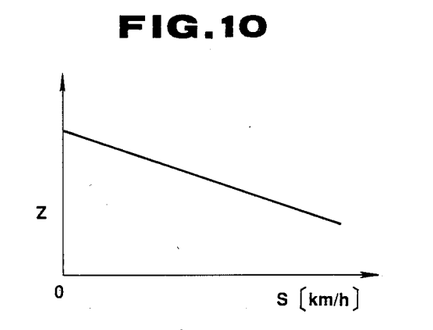
FIG. 10 is a graph showing variation of the slice level setting signal in relation to a vehicle speed.

Based on the vehicle speed data S, the slice level setting signal value Z is derived according to the characteristics shown in FIG. 10, at a step S106. Practically, the slice level setting signal value Z in relation to the vehicle speed S is set in a form of a table in the memory 84. Therefore, derivation of the slice level setting signal value Z is performed by looking up the table in terms of the vehicle speed data S. The slice level setting signal having the value Z derived at the step S106 is then output to the slicer circuits 69a, 69b and 69c via a D/A converter 72 at a step S108.

Figure 13:
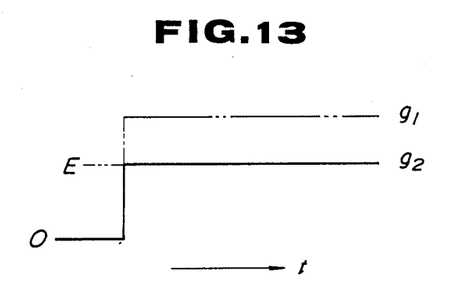
FIG. 13 is a chart showing manner of slicing of a sensor signal.
Figure 14:
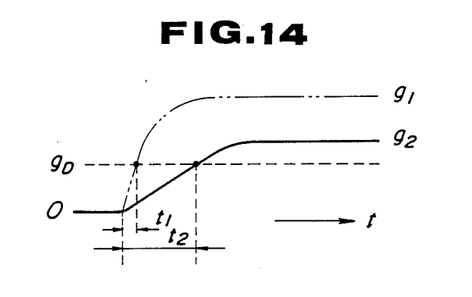
FIG. 14 is a timing chart showing operation of a low-pass filter (LPF) employed in the preferred embodiment of the suspension control circuit of FIG. 7.

By the slice level setting signal from the microprocessor 68, the voltage level +E and −E defining the slice level in the variable direct current source 78a and 78b of the slicer circuit 69a, 69b and 69c is set. Therefore, the vertical acceleration signals of the vertical acceleration sensor 21FR, 21RL and 21RR are shaped by the slicer circuit 69a, 69b and 69c. Namely, the vertical acceleration signal having the signal level higher than the upper slice level +E and having the signal level lower than the lower slice level −E is removed and replaced with the slice levels as shown in FIG. 13. Since response characteristics of the low-pass filters 70a, 70b and 70d are variable depending upon the input signal level, the pressure variation speed of the working fluid in the working chamber 26d is variable depending upon the input level to the low-pass filters. Therefore, when the vertical acceleration indicative signals GZFR, GZRL and GZRR varies to the level $g_1$ as shown by phantom line in FIG. 13, the pressure in the working chamber 26d may vary to reach the maximum pressure in a period $t_1$ as shown by phantom line in FIG. 14 unless the vertical acceleration indicative signal level is not sliced. Whereas, as shown by the solid lines in FIGS. 13 and 14, the period to reach the maximum pressure can be expended to $t_2$ in FIG. 14 by slicing the vertical acceleration indicative signal level at the slice level E and set at the level $g_2$ corresponding to the slice level.

In the routine of FIG. 12, the vertical stroke data vzFR, vzRL and vzRR are read out immediately after starting execution at a step S202. The read vertical stroke data vzFR, vzRL and vzRR are temporarily stored in a temporary register of the input/output interface 80. At a step S204, vertical stroke VZFR, VZRL and VZRR are derived on the basis of the read vertical stroke data vzFR, vzRL and vzRR. Thereafter, the vertical stroke data VZFL is derived on the basis of the read vertical stroke VZFR, VZRL and VZRR at a step S206. Practically, when a vehicle rolls, one of the vertical stroke VZRL and VZRR becomes a positive value and the other becomes a negative value. In such case, the positive value and the negative value of the vertical stroke VZRL and VZRR represent approximately the same magnitude of vertical stroke in the opposite directions. Therefore, by comparing the vertical stroke VZRL and VZRR, the vehicular rolling condition can be detected. If the vehicular rolling condition is detected, the vertical stroke VZFL of the front-left suspension 14FL can be derived by obtaining the value representative of the vertical stroke magnitude equal to that represented by the vertical stroke VZFR in opposite direction to that monitored in the front-right suspension. Similarly, when the vehicle pitches, one of the vertical stroke VZFR and VZRR becomes a positive value and the other becomes a negative value. In such case, the positive value and the negative value of the vertical stroke VZFR and VZRR represent approximately the same magnitude of vertical stroke in the opposite directions. Therefore, by comparing the vertical stroke VZFR and VZRR, the vehicular pitching condition can be detected. If the vehicular pitching condition is detected, the vertical stroke VZFL of the front-left suspension 14FL can be derived by obtaining the value representative of the vertical stroke magnitude equal to that represented by the vertical stroke VZRL in opposite direction to that monitored in the rear-left suspension.

At a step S208, a control current value I for the pressure control valve units 28FL, 28FR, 28RL and 28RR of respective front-left, front-right, rear-left and rear-right suspensions is calculated. The control current value I is calculated by the following equation:

$$I = VZ \times K_z$$

where VZ is VZFL, VZFR, VZRL and VZRR; and Kz is a predetermined constant. After deriving the control current value I at the step S208, the control signal value SC is derived at a value corresponding to the control current value I at a step S210. After outputting the control signal SC at the step S210 process goes END.

As will be appreciated, according to the shown embodiment, abrupt change of the pressure in the working chamber which causes abrupt change of the vehicular height, is successfully prevented. Furthermore, according to the present invention, since the slice level is variable depending upon the vehicular speed so that the slice level is lowered according to increasing of the vehicle speed, vehicular height change at high vehicle speed condition becomes satisfactory to assure prevention of uncomfortable height change.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment adjusts the slice level setting signal level to vary linearly according to increasing of the vehicle speed, it may possible to adjust the slice level setting signal level in stepwise fashion. Furthermore, though the shown embodiment is discussed for bouncing control, it may be possible to apply the similar technology in slicing the sensor signal for preventing abrupt change of the pressure in the working chamber, to any of other suspension control technologies, such as anti-rolling control, anti-pitching control and so forth.

What is claimed is:

1. An actively controlled suspension system comprising:
   a cylinder disposed between a vehicle body and a suspension member which rotatably supports a road wheel, and defining therein a working chamber filled with a pressure medium variable of pressure between a predetermined maximum pressure and a predetermined minimum pressure;
   a pressure medium source circuit means connected to said working chamber, for supplying said pressure medium to said working chamber of said cylinder;
   a pressure control valve means disposed within said pressure medium circuit means and variable of valve position between a first mode for increasing pressure of said pressure medium within said working chamber, a second mode for decreasing pressure in said pressure medium within said working chamber, and a third mode for maintaining said pressure in said pressure medium constant;
   a vehicular attitude change monitoring means for monitoring vehicle body attitude change for producing a vehicle body attitude change indicative sensor signal;
   a vehicular speed monitoring means for monitoring a vehicular driving speed and producing a vehicle speed indicative signal representative of the monitored vehicular speed;
   a limiting means for receiving said attitude change indicative sensor signal and limiting variation range of the value of said attitude change indicative sensor signal within a predetermined range;
   a controller means receiving said sensor signal having said limited range of signal value for deriving a control signal for controlling said pressure control valve means in order to suppress attitude change, said controller means being responsive to said vehicular speed indicative signal for varying said variation range of said attitude change indicative sensor signal depending upon the vehicle speed indicative signal value.

2. An actively controlled suspension system as set forth in claim 1, wherein said controller means sets said attitude change indicative sensor signal value variation range with respect to an initial value of said attitude change indicative sensor signal which is produced when the vehicular attitude is a neutral position and defines said variation range with an upper and a lower slice level.

3. An actively controlled suspension system as set forth in claim 2, wherein said controller means derives a slice level indicative value representative of magnitude of difference of said upper and lower slice level from said initial value on the basis of said vehicle speed indicative sensor signal and adjusts said upper and lower slice level based thereon.

4. An actively controlled suspension system as set forth in claim 3, wherein said controller means varies said slice level indicative value to reduce the value according to increasing of said vehicle speed indicative sensor signal value.

5. An actively controlled suspension system as set forth in claim 4, wherein said controller means varies said slice level indicative value to be inversely proportional to said vehicle speed indicative sensor signal value.

6. An actively controlled suspension system as set forth in claim 4, wherein said controller means varies said slice level indicative value in stepwise fashion according to variation of said vehicle speed indicative sensor signal value.

7. An actively controlled suspension system as set forth in claim 4, wherein said controller means modifies said vehicular attitude change indicative sensor signal level higher than said upper slice level to a value corresponding to said upper slice level and lower than said lower slice level to a value corresponding to said lower slice level.

8. An actively controlled suspension system as set forth in claim 7, wherein said controller means is set in response to pressure control characteristics for controlling pressure of said pressure medium within said working chamber to vary variation speed of the pressure depending upon the signal level of said vehicular attitude change indicative sensor signal.

9. An actively controlled suspension system comprising:
   a cylinder disposed between a vehicle body and a suspension member which rotatably supports a road wheel, and defining therein a working chamber filled with a pressure medium variable of pressure between a predetermined maximum pressure and a predetermined minimum pressure;
   a pressure medium source circuit means connected to said working chamber, for supplying said pressure medium to said working chamber of said cylinder;
   a pressure control valve means disposed within said pressure medium circuit means and variable of valve position between a first mode for increasing pressure of said pressure medium within said working chamber, a second mode for decreasing pressure in said pressure medium within said working chamber, and a third mode for maintaining said pressure in said pressure medium constant;
   a vehicular attitude change monitoring means for monitoring acceleration exerted on said vehicle body and causing attitude change of said vehicle body, for producing an acceleration indicative sensor signal;
   a vehicular speed monitoring means for monitoring a vehicular driving speed and producing a vehicle speed indicative signal representative of the monitored vehicular speed;
   a limiting means for receiving said acceleration indicative sensor signal and limiting variation range of the value of said acceleration indicative sensor signal within a predetermined range;
   a controller means receiving said acceleration indicative sensor signal having said limited range of signal value for deriving a control signal for controlling said pressure control valve means in order to suppress attitude change on the basis of said acceleration indicative sensor signal, said controller means being responsive to said vehicular speed indicative signal for varying said variation range of said acceleration indicative sensor signal depending upon the speed indicative signal value.

10. An actively controlled suspension system as set forth in claim 9, wherein said controller means derives an attitude change stroke data on the basis of said acceleration indicative sensor signal to derive said control signal on the basis of said attitude change stroke data.

11. An actively controlled suspension system as set forth in claim 10, wherein said controller means sets said acceleration indicative sensor signal value variation range with respect to an initial value of said acceleration indicative sensor signal which is produced when the vehicular attitude is a neutral position and defines said variation range with an upper and a lower slice level.

12. An actively controlled suspension system as set forth in claim 11, wherein said controller means derives a slice level indicative value representative of magnitude of difference of said upper and lower slice level from said initial value on the basis of said vehicle speed indicative sensor signal and adjusts said upper and lower slice level based thereon.

13. An actively controlled suspension system as set forth in claim 12, wherein said controller means varies said slice level indicative value to reduce the value according to increasing of said vehicle speed indicative sensor signal value.

14. An actively controlled suspension system as set forth in claim 13, wherein said controller means varies said slice level indicative value to be inversely proportional to said vehicle speed indicative sensor signal value.

15. An actively controlled suspension system as set forth in claim 13, wherein said controller means varies said slice level indicative value in stepwise fashion according to variation of said vehicle speed indicative sensor signal value.

16. An actively controlled suspension system as set forth in claim 13, wherein said controller means modifies said acceleration indicative sensor signal level higher than said upper slice level to a value corresponding to said upper slice level and lower than said lower slice level to a value corresponding to said lower slice level.

17. An actively controlled suspension system as set forth in claim 16, wherein said controller means is set in response to pressure control characteristics for controlling pressure of said pressure medium within said working chamber to vary variation speed of the pressure depending upon the signal level of said acceleration indicative sensor signal.

18. A bouncing control system for an automotive suspension system, comprising:
a cylinder disposed between a vehicle body and a suspension member which rotatably supports a road wheel, and defining therein a working chamber filled with a pressure medium variable of pressure between a predetermined maximum pressure and a predetermined minimum pressure;
a pressure medium source circuit means connected to said working chamber, for supplying said pressure medium to said working chamber of said cylinder;
a pressure control valve means disposed within said pressure medium circuit means and variable of valve position between a first mode for increasing pressure of said pressure medium within said working chamber, a second mode for decreasing pressure in said pressure medium within said working chamber, and a third mode for maintaining said pressure in said pressure medium constant;
a vertical acceleration sensor means for monitoring a vertical acceleration exerted on said vehicle body and causing attitude change of said vehicle body, for producing a vertical acceleration indicative sensor signal;
a vehicular speed monitoring means for monitoring a vehicular driving speed and producing a vehicle speed indicative signal representative of the monitored vehicular speed;
a slicer means for receiving said vertical acceleration indicative sensor signal and slicing said acceleration indicative signal level out of a predetermined vertical acceleration indicative signal value variation range to produce a sliced level vertical acceleration indicative signal;
a controller means receiving said sliced level vertical acceleration indicative sensor signal for deriving a control signal for controlling said pressure control valve means in order to adjust the pressure of pressure medium within said working chamber to suppress bouncing of said vehicle body, on the basis of said sliced level vertical acceleration indicative sensor signal, said controller means being responsive to said vehicular speed indicative signal for varying said variation range of said vertical acceleration indicative sensor signal depending upon the vehicle speed indicative signal value.

19. An actively controlled suspension system as set forth in claim 18, wherein said controller means derives a stroke data representative of bounding and rebounding motion of said vehicle body on the basis of said vertical acceleration indicative sensor signal to derive said control signal on the basis of said stroke data.

20. An actively controlled suspension system as set forth in claim 19, wherein controller means includes a low-pass filer means for deriving said stroke data on the basis of said vertical acceleration indicative sensor signal value.

21. An actively controlled suspension system as set forth in claim 19, wherein said controller means includes an integrator means for deriving said stroke data on the basis of said vertical acceleration indicative sensor signal value.

22. An actively controlled suspension system as set forth in claim 18, wherein said controller means sets said acceleration indicative sensor signal value variation range with respect to an initial value of said vertical acceleration indicative sensor signal which is produced when the vehicular attitude is a neutral position and defines said variation range with an upper and a lower slice level.

23. An actively controlled suspension system as set forth in claim 22, wherein said controller means derives a slice level indicative value representative of magnitude of difference of said upper and lower slice level from said initial value on the basis of said vehicle speed indicative sensor signal and adjusts said upper and lower slice level based thereon.

24. An actively controlled suspension system as set forth in claim 23, wherein said controller means varies said slice level indicative value to reduce the value according to increasing of said vehicle speed indicative sensor signal value.

25. An actively controlled suspension system as set forth in claim 24, wherein said controller means varies said slice level indicative value to be inversely proportional to said vehicle speed indicative sensor signal value.

26. An actively controlled suspension system as set forth in claim 24, wherein said controller means varies said slice level indicative value in stepwise fashion according to variation of said vehicle speed indicative sensor signal value.

27. An actively controlled suspension system as set forth in claim 24, wherein said controller means modifies said vertical acceleration indicative sensor signal level higher than said upper slice level to a value corresponding to said upper slice level and lower than said lower slice level to a value corresponding to said lower slice level.

28. An actively controlled suspension system as set forth in claim 27, wherein said controller means is set in response to pressure control characteristics for controlling pressure of said pressure medium within said working chamber to vary variation speed of the pressure depending upon the signal level of said vertical acceleration indicative sensor signal.

* * * * *